United States Patent
Dietzsch et al.

[11] 4,206,972
[45] Jun. 10, 1980

[54] HIGH RESOLVING OBJECTIVE COVERING A WIDE SPECTRAL RANGE

[76] Inventors: Eberhard Dietzsch, 100, Emil-Höllein-Strasse, Jena, District of Gera; Gerhard Eberitsch, 96, Grosseutersdorf, District of Gera, both of German Democratic Rep.

[21] Appl. No.: 864,839

[22] Filed: Jan. 13, 1978

[30] Foreign Application Priority Data
Jan. 27, 1977 [DD] German Democratic Rep. ... 197105

[51] Int. Cl.² ............................................. G02B 11/34
[52] U.S. Cl. ...................................................... 350/214
[58] Field of Search ......................................... 350/214

[56] References Cited
U.S. PATENT DOCUMENTS
3,524,699  8/1970  Mori ........................................ 350/214
3,551,030  12/1970  Gilkeson et al. ....................... 350/214

FOREIGN PATENT DOCUMENTS
47-12957 of 1972 Japan ......................................... 350/214

Primary Examiner—Conrad J. Clark

[57] ABSTRACT

The invention concerns a high-resolving objective particularly for use in aerial photography based on the double-gauss objective type, covering a wide spectral range, and which at a relative aperture of 1:4 images an image field of $2\sigma > 40°$ without aberrations.

7 Claims, 1 Drawing Figure

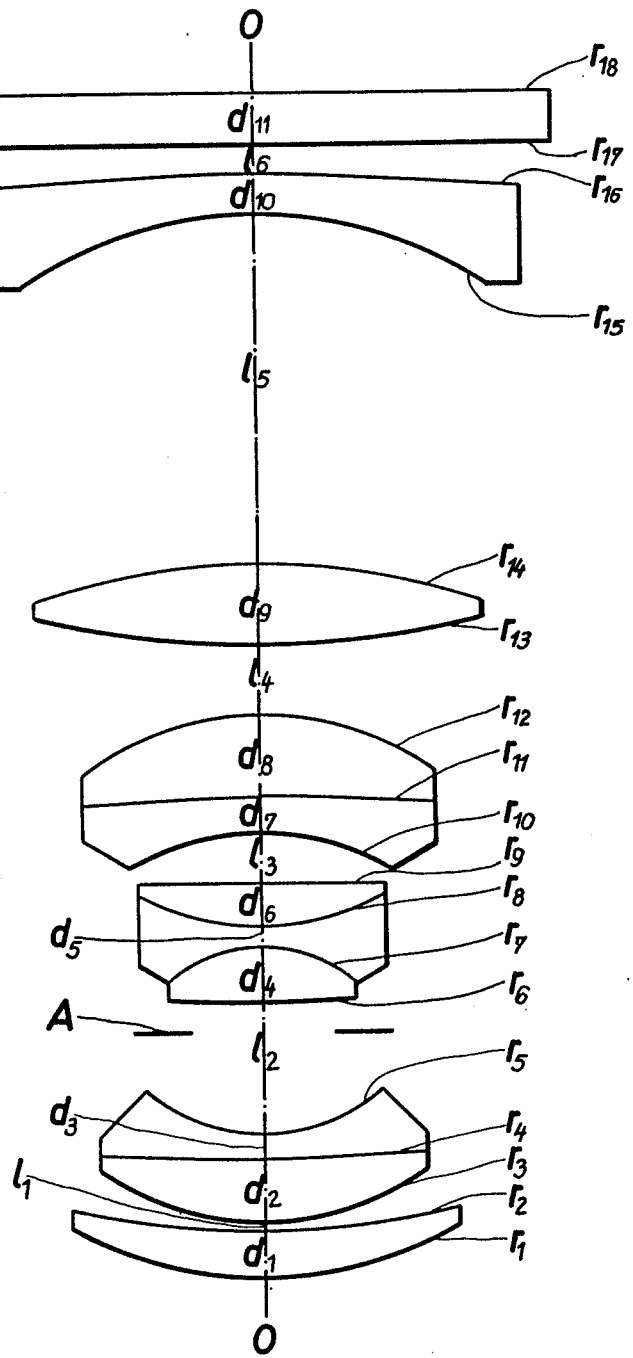

HIGH RESOLVING OBJECTIVE COVERING A WIDE SPECTRAL RANGE

This invention concerns a high resolving photographic objective of the double Gauss type covering a wide spectral range. The objective has a relative aperture of about 1:4, and is capable to produce an image field of $2\sigma > 40°$ without distortion.

The inventive objective is for use in the aerial photography particularly in multispectral cameras. Photographic objectives of the above parameters are known, however, they do not actually realize the theoretical resolution or only for narrow image fields and a narrow spectral range. Objectives which are corrected for apochromatism over a comparatively wide spectral range only have a high quality correction of the image aberrations with respect to the axial point and not for a wide image field so that the resolution obtained is poor. Furthermore, such objectives with an increasing image field angle, give rise to vignetting effects apart from the fact that, considered from a constructional viewpoint, and when objectives of the double-gauss type are concerned, a cemented lens is arranged in the aperture space constituted of a plurality of individual lenses so that there is no room left to install an aperture and an aperture stop.

It is an object of the present invention to obviate the above disadvantages.

It is a further object of the present invention to provide a high efficient objective which permits high quality photographing from considerable altitudes and which fully exploits fine-grained film materials.

It is still a further object of the present invention to provide an objective which, at a focal length of $f = 125$ mm and a relative aperture of 1:4 images an image field of $2\sigma \geq 40°$ free of any distortions with high resolution over the spectral range of about 450 nanometer to 850 nanometer. High resolution is here to be understood that the resolution depends on the diffraction and is not subject to any aberration. High resolution of an image field further includes that the objective eliminates any vignetting effects and that a brightness distribution is attained which at least satisfies the $\cos^4$ law.

To obtain an even transmittance over a wide spectral range only a few special glasses or heavy flint glass having refractive indices over 1.68 are employed.

It is still a further object of the present invention to provide an objective which permits variation of the focal length of about one percent by variation of only one air space without deteriorating the correction of the other lens members. This is necessary if a plurality of objectives are operating at the same time in different spectral ranges to compensate for focal length variations which might result from the production process. It is a condition that the individual images so produced are of identical sizes which is required for a later evaluation procedure.

These and other objects are realised by an objective of the double gauss type in which two meniscus lenses are so arranged that their concave faces are in mutual opposition thus forming a cavity in which an aperture is located, the convex faces of said meniscus lenses are each confronted by a collective lens. In order to reduce a secondary spectrum a triple lens is arranged behind the aperture in said cavity, considered in the direction of light propagation. Said triple lens is constituted of a collective lens cemented to a biconcave lens, the material of which being short flint glass has the property to reduce severely the dispersion in the short wave range. A further collective lens is cemented to the other concave face of the biconcave lens. To improve the flatness of the image plane and to eliminate the oblique spherical aberration a converging meniscus lens is arranged with its concave face adjacent and in opposition to the image plane. The meniscus lenses which form the aperture space are each provided with a cemented face for achromatising effects, and the collective lenses including said meniscus lenses, are a meniscus lens on the object side, and a biconvex lens on the image side. An objective constituted in such a manner ensures an apochromatic highly resolving correction over a wide image field by only employing one extreme short flint glass, whereas the other lenses are of the generally used optical glass. So it is possible to keep the average value of all refractive indices of the used glasses employed below 1.6. This is of concern in as much as the required even light transmissivity can most easily be satisfied by use of optical glass of low refractive index, whereas glass of a high refractive index, particularly heavy flint glass is strongly absorbing in the short wave range of the spectrum.

Since an extreme short flint glass is very sensitive towards environmental influences it is necessary to protect optical lenses made of such material. This is, according to the invention, achieved in a simple way by the arrangement of the flint glass lens within the triplet lens group. In order to eliminate any difficulties arising from the strong curvature of the cemented faces, the discontinuities of the refractive index are not permitted to lie above 0.03. Discontinuities in the $\nu_e$ numbers which occur for the same reason at these cemented faces must not be greater than 13 to avoid color displacements due to decentering. Furthermore, the convex (with respect to the aperture) cemented face of the triple lens tends to produce an increasing astigmatism with an increasing curvature which effect becomes more striking as chromatic astigmatism with increasing discontinuities of the $\gamma_e$ values at said face. Therefore, and in order to keep the astigmatic color aberrations to tolerable values, the discontinuities of the $\nu_e$-values of said face must not become too great or the radius ($r_8$) of the cemented face must not become too small with respect to the focal length f of the entire system. When the condition $r_8 > 0.04 \cdot f \cdot |\Delta \nu_e|$ is satisfied any interfering color astigmatism is eliminated, where $\Delta \gamma_e$ is the difference of the Abbe $\gamma$ numbers of the glass material employed for the lenses on both sides of the cemented face $r_8$. The chromatic astigmatism is additionally eliminated when the cemented face of the meniscus lens following the triple lens is slightly curved with the convex face towards the aperture. A further problem is the centricity of the triple lens which is of particular sensitivity in this respect. In order to reduce any effects resulting therefrom the focal length of the triple lens ought to be positive and, compared to the entire objective focal length, has to be at least two times the entire focal length f.

A positive focal length of the triple lens smaller than $6 \cdot f$ is of advantage with respect to the entire refractive power of the objective which permits a reduction of the refractive power of the remaining components and hence involves a further reduction of the image aberrations. Thus, the effects of the originally diverging (in the conventional double gauss type) meniscus lens following the triple lens considered in the direction of the light propagation can be reduced and the lens can even become afocal where the focal length is positive or negative and has an absolute value greater than 5 f.

When objectives of such a construction are subject to extreme temperatures variations the linear coefficients of thermal expansion of the glass material of the triple lens including the strongly curved cemented faces have substantially to be identical. Since the extreme short flint glass has a comparatively low coefficient of thermal expansion only a few optical glass combinations are feasible.

Satisfactory results are obtained with optical glass combination of KzFS2, SK11, PalF4, and KZFS1, SSK2, SK9 or SK6, all products of Saale-Glas G.m.b.H. of Jena, G.D.R. The diverging meniscus lens which is located adjacent to the image plane affects the flatness of the image field and supports the effects of the diverging meniscus lenses which include the aperture so that the spherical lateral and transversal aberration is further reduced.

Such a lens, however, displaces the front principal point which is not without influence upon the secondary transverse spectrum. To keep the latter to tolerable limits the diverging meniscus lens located adjacent to the image plane must not be too diverging and the focal length has to be considerably greater than f. The focal length of the entire optical system is adjusted by variation of the object side air space.

The correction is not affected by the adjustment when the meniscus lens is so curved that the convex face is opposite to the image plane. A plano-parallel plate which ensures a plane position of a film or permits copying of a réseau in the course of an exposure is arranged in the image plane, the astigmatic effect of which has to be taken into consideration when the entire system is adjusted.

In order that the invention may be more readily understood reference is made to the accompanying drawing which illustrates diagrammatically and by way of example one embodiment thereof and where the FIGURE is a schematical view of the inventional objective. The following Tables 1 to 4 exemplify the range in which by virtue of the invention reasonable optical systems are feasible. In the FIGURE an objective based upon the conventional double gauss type, arranged about an optical axis O—O and considered in the direction of light propagation is constituted of a collective meniscus lens $d_1$ which has its concave face to the image side, followed by a cemented meniscus lens $d_2$, $d_3$ and spaced to the lens $d_1$ by an airspace $l_1$. The cemented meniscus lens $d_2$, $d_3$ has its concave face to the image side. An aperture A is located subsequent to the lens $d_2$, $d_3$ and is followed by a triple lens $d_4$, $d_5$, $d_6$, a further cemented lens $d_7$, $d_8$, a biconvex lens $d_9$, a diverging meniscus lens $d_{10}$, having its convex face to the image side, and a plano-parallel plate $d_{11}$ the face $r_{18}$ of which coincides with the image plane and serves as a film support or for copying réseaus. The lenses $d_1$, $d_2$, $d_3$, $d_7$, $d_8$, and $d_9$ constitute the conventional double gauss-type objective. Due to the inventional additions the image side cemented lens $d_7$, $d_8$ is of a substantially afocal shape and variations as stated in the following Tables (in particular in Table 4) are feasible, where said $d_7/d_8$ lens is a collective one. The two meniscus lenses $d_2$, $d_3$ and $d_7$, $d_8$ form an aperture cavity in which the aperture A is arranged. Furthermore, and spaced by the air space $l_2$ from the meniscus lens $d_2$, $d_3$ and by an airspace $l_3$ from the meniscus lens $d_2$, $d_3$, the triple lens $d_4$, $d_5$, $d_6$ is located behind the aperture.

The effects obtained by such an arrangement are described hereinabove.

Table 1

| $f = 1$ radii | relative aperture 1:4 thickness and airspaces | image field angle $2\sigma = 41°$ refractive indices $n_e$ | Abbe $\nu e$ numbers |
|---|---|---|---|
| $r_1 = +0.5618$ | | | |
| | $d_1 = 0.0640$ | 1.51678 | 54.40 |
| $r_2 = +1.2451$ | | | |
| | $l_1 = 0.0080$ | | |
| $r_3 = +0.3873$ | | | |
| | $d_2 = 0.0910$ | 1.56606 | 60.48 |
| $r_4 = +13.2801$ | | | |
| | $d_3 = 0.0320$ | 1.53187 | 51.54 |
| $r_5 = +0.2590$ | | | |
| | $l_2 = 0.1780$ | | |
| $r_6 = +1.9199$ | | | |
| | $d_4 = 0.0720$ | 1.56606 | 60.48 |
| $r_7 = -0.1922$ | | | |
| | $d_5 = 0.0240$ | 1.56028 | 53.67 |
| $r_8 = +0.3049$ | | | |
| | $d_6 = 0.0642$ | 1.58213 | 53.60 |
| $r_9 = -24.0242$ | | | |
| | $l_3 = 0.0698$ | | |
| $r_{10} = -0.3543$ | | | |
| | $d_7 = 0.0440$ | 1.67764 | 32.01 |
| $r_{11} = -3.9120$ | | | |
| | $d_8 = 0.1077$ | 1.62554 | 57.87 |
| $r_{12} = -0.3965$ | | | |
| | $l_4 = 0.0898$ | | |
| $r_{13} = +1.5288$ | | | |
| | $d_9 = 0.1080$ | 1.59424 | 57.97 |
| $r_{14} = -1.0407$ | | | |
| | $l_5 = 0.4791$ | | |
| $r_{15} = -0.5618$ | | | |
| | $d_{10} = 0.0480$ | 1.51859 | 63.87 |
| $r_{16} = -5.6313$ | | | |
| | $l_6 = 0.0391$ | | |
| $r_{17} = \infty$ | | | |
| | $d_{11} = 0.0640$ | 1.54983 | 53.33 |
| $r_{18} = \infty$ | | | |

Table 2

| $f = 1$ radii | relative aperture 1:4 thicknesses and airspaces | image field angle $2\delta = 41°$ refractive indices $n_e$ | Abbe $\nu e$ numbers |
|---|---|---|---|
| $r_1 = +0.5771$ | | | |
| | $d_1 = 0.0624$ | 1.53187 | 51.54 |
| $r_2 = +1.1395$ | | | |
| | $l_1 = 0.0096$ | | |
| $r_3 = +0.3863$ | | | |
| | $d_2 = 0.0889$ | 1.59424 | 57.97 |
| $r_4 = +4.0873$ | | | |
| | $d_3 = 0.0298$ | 1.53187 | 51.54 |
| $r_5 = +0.2594$ | | | |
| | $l_2 = 0.1820$ | | |
| $r_6 = +1.8215$ | | | |
| | $d_4 = 0.0720$ | 1.56606 | 60.48 |
| $r_7 = -0.1794$ | | | |
| | $d_5 = 0.0240$ | 1.56028 | 53.67 |
| $r_8 = +0.3579$ | | | |
| | $d_6 = 0.0626$ | 1.56606 | 60.48 |
| $r_9 = -38.0006$ | | | |
| | $l_3 = 0.0640$ | | |
| $r_{10} = -0.3624$ | | | |
| | $d_7 = 0.0400$ | 1.65968 | 33.15 |
| $r_{11} = -5.2876$ | | | |
| | $d_8 = 0.1040$ | 1.59424 | 57.97 |
| $r_{12} = -0.4172$ | | | |
| | $l_4 = 0.0960$ | | |
| $r_{13} = +1.6014$ | | | |
| | $d_9 = 0.1120$ | 1.59424 | 57.97 |
| $r_{14} = -0.8313$ | | | |
| | $l_5 = 0.4871$ | | |
| $r_{15} = -0.5332$ | | | |

Table 2-continued

| f = 1 radii | relative aperture 1:4 thicknesses and airspaces | image field angle 2δ = 41° refractive indices $n_e$ | Abbe $\nu_e$ numbers |
|---|---|---|---|
| $r_{16} = -5.7546$ | $d_{10} = 0.0464$ | 1.51859 | 63.87 |
| $r_{17} = \infty$ | $l_6 = 0.0320$ | | |
| $r_{18} = \infty$ | $d_{11} = 0.0800$ | 1.51859 | 6387 |

Table 3

| f = 1 radii | relative aperture 1:4 thicknesses and airspaces | image field angle 2δ = 41° refractive indices $n_e$ | Abbe $\nu_e$ numbers |
|---|---|---|---|
| $r_1 = +0.5553$ | $d_1 = 0.0720$ | 1.53187 | 51.54 |
| $r_2 = +1.2827$ | $l_1 = 0.0096$ | | |
| $r_3 = +0.3951$ | | | |
| $r_4 = +2.0119$ | $d_2 = 0.0882$ | 1.59424 | 57.97 |
| $r_5 = +0.2572$ | $d_3 = 0.0298$ | 1.53187 | 51.54 |
| $r_6 = +2.4195$ | $l_2 = 0.1860$ | | |
| $r_7 = -0.1898$ | $d_4 = 0.0720$ | 1.62508 | 52.84 |
| $r_8 = +0.4003$ | $d_5 = 0.0240$ | 1.61637 | 43.78 |
| $r_9 = +36.2323$ | $d_6 = 0.0626$ | 1.62508 | 52.84 |
| $r_{10} = -0.3539$ | $l_3 = 0.0560$ | | |
| $r_{11} = -1.7639$ | $d_7 = 0.0400$ | 1.61685 | 36.70 |
| $r_{12} = -0.4231$ | $d_8 = 0.1040$ | 1.59424 | 57.97 |
| $r_{13} = +1.7610$ | $l_4 = 0.0842$ | | |
| $r_{14} = -0.8211$ | $d_9 = 0.1120$ | 1.59424 | 57.97 |
| $r_{15} = -0.5616$ | $l_5 = 0.4858$ | | |
| $r_{16} = -4.4928$ | $d_{10} = 0.0464$ | 1.51859 | 63.87 |
| $r_{17} = \infty$ | $l_6 = 0.0320$ | | |
| $r_{18} = \infty$ | $d_{11} = 0.0720$ | 1.51859 | 63.87 |

Table 4

| F = 1 radii | relative aperture 1:4 thicknesses and airspaces | image field angle 2δ = 41° refractive indices $n_e$ | Abbe $\nu_e$ numbers |
|---|---|---|---|
| $r_1 = +0.5467$ | $d_1 = 0.0640$ | 1.53430 | 48.62 |
| $r_2 = +1.3161$ | $l_1 = 0.0080$ | | |
| $r_3 = +0.3852$ | | | |
| $r_4 = +5.5860$ | $d_2 = 0.0845$ | 1.59424 | 57.97 |
| $r_5 = +0.2455$ | $d_3 = 0.0320$ | 1.53187 | 51.54 |
| $r_6 = +4.1004$ | $l_2 = 0.1920$ | | |
| $r_7 = -0.2042$ | $d_4 = 0.0720$ | 1.61636 | 56.03 |
| $r_8 = +0.4122$ | $d_5 = 0.0200$ | 1.61637 | 43.78 |
| $r_9 = \infty$ | $d_6 = 0.0584$ | 1.62508 | 52.84 |
| $r_{10} = -0.3732$ | $l_3 = 0.0696$ | | |
| $r_{11} = -2.2112$ | $d_7 = 0.0520$ | 1.60813 | 37.89 |
| $r_{12} = -0.4107$ | $d_8 = 0.0920$ | 1.59424 | 57.97 |
| $r_{13} = +1.5906$ | $l_4 = 0.1000$ | | |
| $r_{14} = -0.8462$ | $d_9 = 0.1080$ | 1.59424 | 57.97 |
| $r_{15} = -0.5685$ | $l_5 = 0.4543$ | | |
| $r_{16} = -6.3761$ | $d_{10} = 0.0480$ | 1.51859 | 63.87 |
| $r_{17} = \infty$ | $l_6 = 0.0640$ | | |
| $r_{18} = \infty$ | $d_{11} = 0.0640$ | 1.51859 | 63.87 |

We claim:

1. A high-resolving objective based upon the double gauss type covering a wide spectral range, particular for taking aerial photographs, comprising, considered in the direction of light propagation and arranged about an axis O—O,
a collective meniscus lens with the concave face to the image side,
a first cemented meniscus type lens with the concave face to the image side,
an aperture,
a cemented collective triple lens constituted of a first collective lens, a biconcave lens of short flint glass material with a severely reduced partial dispersion in the shortwave range of the spectrum, and a second collective lens,
a second cemented meniscus type lens with the convex face to the image side,
a biconvex lens,
and a diverging meniscus lens with the convex face to the image.

2. An objective as claimed in claim 1, wherein said diverging meniscus lens is followed by a plano-parallel plate, the image side face of which being arranged in the image plane of said objective.

3. An objective as claimed in claim 2, wherein a cemented face $r_8$ between said biconcave lens and said second collective lens satisfies the condition $r_8 > 0.04 \cdot f \cdot |\Delta \nu_e|$ where $\Delta \gamma_e$ is the difference of the Abbe $\nu_e$ number of the glass materials adjacent to said cemented face $r_8$, and f the focal length of the entire objective, and wherein the focal length of said second meniscus type lens has an absolute value greater than 5 f.

4. An objective as claimed in claim 3, characterised by the parameters and features specified in the following Table 1:

Table 1

| f = 1 radii | relative aperture 1:4 thickness and airspaces | image field angle 2σ = 41° refractive indices $n_e$ | Abbe $\nu_e$ numbers |
|---|---|---|---|
| $r_1 = +0.5618$ | $d_1 = 0.0640$ | 1.51678 | 54.40 |
| $r_2 = +1.2451$ | | | |

Table 1-continued

| $f = 1$ radii | relative aperture 1:4 thickness and airspaces | image field angle $2\sigma = 41°$ refractive indices $n_e$ | Abbe $\nu e$ numbers |
|---|---|---|---|
| $r_3 = +0.3873$ | $l_1 = 0.0080$ | | |
| $r_4 = +13.2801$ | $d_2 = 0.0910$ | 1.56606 | 60.48 |
| $r_5 = +0.2590$ | $d_3 = 0.0320$ | 1.53187 | 51.54 |
| $r_6 = +1.9199$ | $l_2 = 0.1780$ | | |
| $r_7 = -0.1922$ | $d_4 = 0.0720$ | 1.56606 | 60.48 |
| $r_8 = +0.3049$ | $d_5 = 0.0240$ | 1.56028 | 53.67 |
| $r_9 = -24.0242$ | $d_6 = 0.0642$ | 1.58213 | 53.60 |
| $r_{10} = -0.3543$ | $l_3 = 0.0698$ | | |
| $r_{11} = -3.9120$ | $d_7 = 0.0440$ | 1.67764 | 32.01 |
| $r_{12} = -0.3965$ | $d_8 = 0.1077$ | 1.62554 | 57.87 |
| $r_{13} = +1.5288$ | $l_4 = 0.0898$ | | |
| $r_{14} = -1.0407$ | $d_9 = 0.1080$ | 1.59424 | 57.97 |
| $r_{15} = -0.5618$ | $l_5 = 0.4791$ | | |
| $r_{16} = -5.6313$ | $d_{10} = 0.0480$ | 1.51859 | 63.87 |
| $r_{17} = \infty$ | $l_6 = 0.0391$ | | |
| $r_{18} = \infty$ | $d_{11} = 0.0640$ | 1.54983 | 53.33 |

5. An objective as claimed in claim 3, characterised by the parameters and features specified in the following Table 2:

Table 2

| $f = 1$ radii | relative aperture 1:4 thicknesses and airspaces | image field angle $2\delta = 41°$ refractive indices $n_e$ | Abbe $\nu e$ numbers |
|---|---|---|---|
| $r_1 = +0.5771$ | $d_1 = 0.0624$ | 1.53187 | 51.54 |
| $r_2 = +1.1395$ | $l_1 = 0.0096$ | | |
| $r_3 = +0.3863$ | $d_2 = 0.0889$ | 1.59424 | 57.97 |
| $r_4 = +4.0873$ | $d_3 = 0.0298$ | 1.53187 | 51.54 |
| $r_5 = +0.2594$ | $l_2 = 0.1820$ | | |
| $r_6 = +1.8215$ | $d_4 = 0.0720$ | 1.56606 | 60.48 |
| $r_7 = -0.1794$ | $d_5 = 0.0240$ | 1.56028 | 53.67 |
| $r_8 = +0.3579$ | $d_6 = 0.0626$ | 1.56606 | 60.48 |
| $r_9 = -38.0006$ | $l_3 = 0.0640$ | | |
| $r_{10} = -0.3624$ | $d_7 = 0.0400$ | 1.65968 | 33.15 |
| $r_{11} = -5.2876$ | $d_8 = 0.1040$ | 1.59424 | 57.97 |
| $r_{12} = -0.4172$ | $l_4 = 0.0960$ | | |
| $r_{13} = +1.6014$ | $d_9 = 0.1120$ | 1.59424 | 57.97 |
| $r_{14} = -0.8313$ | $l_5 = 0.4871$ | | |
| $r_{15} = -0.5332$ | $d_{10} = 0.0464$ | 1.51859 | 63.87 |
| $r_{16} = -5.7546$ | $l_6 = 0.0320$ | | |
| $r_{17} = \infty$ | | | |

Table 2-continued

| $f = 1$ radii | relative aperture 1:4 thicknesses and airspaces | image field angle $2\delta = 41°$ refractive indices $n_e$ | Abbe $\nu e$ numbers |
|---|---|---|---|
| | $d_{11} = 0.0800$ | 1.51859 | 6387 |
| $r_{18} = \infty$ | | | |

6. An objective as claimed in claim 3, characterised by the parameters and features specified in the following Table 3:

Table 3

| $f = 1$ radii | relative aperture 1:4 thicknesses and airspaces | image field angle $2\delta = 41°$ refractive indices $n_e$ | Abbe $\nu_e$ numbers |
|---|---|---|---|
| $r_1 = +0.5553$ | $d_1 = 0.0720$ | 1.53187 | 51.54 |
| $r_2 = +1.2827$ | $l_1 = 0.0096$ | | |
| $r_3 = +0.3951$ | $d_2 = 0.0882$ | 1.59424 | 57.97 |
| $r_4 = +2.0119$ | $d_3 = 0.0298$ | 1.53187 | 51.54 |
| $r_5 = +0.2572$ | $l_2 = 0.1860$ | | |
| $r_6 = +2.4195$ | $d_4 = 0.0720$ | 1.62508 | 52.84 |
| $r_7 = -0.1898$ | $d_5 = 0.0240$ | 1.61637 | 43.78 |
| $r_8 = +0.4003$ | $d_6 = 0.0626$ | 1.62508 | 52.84 |
| $r_9 = +36.2323$ | $l_3 = 0.0560$ | | |
| $r_{10} = -0.3539$ | $d_7 = 0.0400$ | 1.61685 | 36.70 |
| $r_{11} = -1.7639$ | $d_8 = 0.1040$ | 1.59424 | 57.97 |
| $r_{12} = -0.4231$ | $l_4 = 0.0842$ | | |
| $r_{13} = +1.7610$ | $d_9 = 0.1120$ | 1.59424 | 57.97 |
| $r_{14} = -0.8211$ | $l_5 = 0.4858$ | | |
| $r_{15} = -0.5616$ | $d_{10} = 0.0464$ | 1.51859 | 63.87 |
| $r_{16} = -4.4928$ | $l_6 = 0.0320$ | | |
| $r_{17} = \infty$ | $d_{11} = 0.0720$ | 1.51859 | 63.87 |
| $r_{18} = \infty$ | | | |

7. An objective as claimed in claim 3, characterised by the parameters and features specified in the following Table 4:

Table 4

| $F = 1$ radii | relative aperture 1:4 thicknesses and airspaces | image field angle $2\delta = 41°$ refractive indices $n_e$ | Abbe $\nu_e$ numbers |
|---|---|---|---|
| $r_1 = +0.5467$ | $d_1 = 0.0640$ | 1.53430 | 48.62 |
| $r_2 = +1.3161$ | $l_1 = 0.0080$ | | |
| $r_3 = +0.3852$ | $d_2 = 0.0845$ | 1.59424 | 57.97 |
| $r_4 = +5.5860$ | $d_3 = 0.0320$ | 1.53187 | 51.54 |
| $r_5 = +0.2455$ | $l_2 = 0.1920$ | | |
| $r_6 = +4.1004$ | $d_4 = 0.0720$ | 1.61636 | 56.03 |
| $r_7 = -0.2042$ | | | |

Table 4-continued

| F = 1 radii | relative aperture 1:4 thicknesses and airspaces | image field angle 2δ= 41° | |
|---|---|---|---|
| | | refractive indices $n_e$ | Abbe $\nu_e$ numbers |
| | $d_5 = 0.0200$ | 1.61637 | 43.78 |
| $r_8 = +0.4122$ | | | |
| | $d_6 = 0.0584$ | 1.62508 | 52.84 |
| $r_9 = \infty$ | | | |
| | $l_3 = 0.0696$ | | |
| $r_{10} = -0.3732$ | | | |
| | $d_7 = 0.0520$ | 1.60813 | 37.89 |
| $r_{11} = -2.2112$ | | | |

Table 4-continued

| F = 1 radii | relative aperture 1:4 thicknesses and airspaces | image field angle 2δ= 41° | |
|---|---|---|---|
| | | refractive indices $n_e$ | Abbe $\nu_e$ numbers |
| | $d_8 = 0.0920$ | 1.59424 | 57.97 |
| $r_{12} = -0.4107$ | | | |
| | $l_4 = 0.1000$ | | |
| $r_{13} = +1.5906$ | | | |
| | $d_9 = 0.1080$ | 1.59424 | 57.97 |
| $r_{14} = -0.8462$ | | | |
| | $l_5 = 0.4543$ | | |
| $r_{15} = -0.5685$ | | | |
| | $d_{10} = 0.0480$ | 1.51859 | 63.87 |
| $r_{16} = -6.3761$ | | | |
| | $l_6 = 0.0640$ | | |
| $r_{17} = \infty$ | | | |
| | $d_{11} = 0.0640$ | 1.51859 | 63.87 |
| $r_{18} = \infty$ | | | |

* * * * *